United States Patent
Madden et al.

(10) Patent No.: US 11,954,018 B2
(45) Date of Patent: Apr. 9, 2024

(54) SCENARIO ANALYSIS PREDICTION AND GENERATION ACCELERATOR

(71) Applicant: Charter Communications Operating, LLC, St. Louis, MO (US)

(72) Inventors: Steven Madden, Wildwood, MO (US); Mark Elking, O'Fallon, MO (US); Bethany A. Lankford, Wildwood, MO (US)

(73) Assignee: Charter Communications Operating, LLC, St. Louis, MO (US)

( * ) Notice: Subject to any disclaimer, the term of this patent is extended or adjusted under 35 U.S.C. 154(b) by 304 days.

(21) Appl. No.: 17/443,362

(22) Filed: Jul. 26, 2021

(65) Prior Publication Data

US 2023/0029415 A1    Jan. 26, 2023

(51) Int. Cl.
G06F 11/36    (2006.01)
G06F 18/214    (2023.01)
G06N 20/00    (2019.01)

(52) U.S. Cl.
CPC ...... *G06F 11/3684* (2013.01); *G06F 11/3688* (2013.01); *G06F 11/3692* (2013.01); *G06F 18/214* (2023.01); *G06N 20/00* (2019.01)

(58) Field of Classification Search
CPC ............. G06F 11/3684; G06F 11/3688; G06F 11/3692; G06F 18/214; G06N 20/00
See application file for complete search history.

(56) References Cited

U.S. PATENT DOCUMENTS

| 8,190,647 | B1* | 5/2012 | Pereira | G06F 21/562 |
| | | | | 707/780 |
| 9,442,830 | B1* | 9/2016 | Zhang | G06F 11/3676 |
| 10,205,637 | B2 | 2/2019 | Porras et al. | |
| 2017/0093684 | A1* | 3/2017 | Jayaraman | G06Q 30/012 |
| 2017/0372436 | A1* | 12/2017 | Dalal | G06N 20/00 |

(Continued)

OTHER PUBLICATIONS

Wójcicki, Bartlomiej, and Robert Dabrowski. "Applying machine learning to software fault prediction." e-Informatica Software Engineering Journal 12.1 (2018). (Year: 2018).*

(Continued)

*Primary Examiner* — Kevin L Young
*Assistant Examiner* — Joanne G Macasiano
(74) *Attorney, Agent, or Firm* — Young Basile Hanlon & MacFarlane, P.C.

(57) ABSTRACT

Described are methods and systems for predicting and generating impacted scenarios based on a defined set of attributes. The system includes one or more databases. The processors are configured to receive a set of service provider system attributes for a project, generate attribute combinations from the set of service provider system attributes using a machine learning model trained on a reference data model, wherein the reference data model includes multiple test scenarios from the one or more databases, each test scenario associated with a test scenario attribute combination, generate predicted scenarios from the attribute combinations using the machine learning model, determine impacted service provider systems based on the predicted scenarios, determine issues based on each of the predicted scenarios, and generate a complexity score based on the determined impacted service provider systems and the determined issues to determine project viability.

17 Claims, 12 Drawing Sheets

(56) References Cited

U.S. PATENT DOCUMENTS

| | | | |
|---|---|---|---|
| 2018/0373824 A1 | 12/2018 | Meagher et al. | |
| 2019/0294633 A1* | 9/2019 | Dembo | G06N 20/00 |
| 2020/0210888 A1* | 7/2020 | Eldardiry | G06N 5/048 |
| 2020/0334603 A1* | 10/2020 | Abdollahnejadbarough | G06F 40/20 |
| 2020/0348662 A1* | 11/2020 | Cella | G05B 23/0286 |
| 2021/0125124 A1* | 4/2021 | Meharwade | G06N 20/00 |
| 2021/0125148 A1* | 4/2021 | Kulkarni | G06N 20/00 |
| 2021/0349811 A1* | 11/2021 | Quemy | G06F 11/3684 |
| 2022/0261306 A1* | 8/2022 | Chandrasekaran | G06F 11/079 |
| 2022/0300400 A1* | 9/2022 | Bikkina | G06F 11/3684 |
| 2023/0017316 A1* | 1/2023 | Kulkarni | G06Q 10/103 |

OTHER PUBLICATIONS

Zarnekow, Ruediger, and Walter Brenner. "Distribution of cost over the application lifecycle-a multi-case study." ECIS 2005 proceedings (2005): 26. (Year: 2005).*

Foderaro, Andrea Simone. Automatic Classification of Software Issue Report. Diss. Politecnico di Torino, 2020. (Year: 2020).*

\* cited by examiner

SCENARIO ANALYSIS PREDICTION AND GENERATION ACCELERATOR

TECHNICAL FIELD

This disclosure relates to software and application development technology.

BACKGROUND

Large and complex computing systems, data processing systems, infrastructure systems and networks, and similar systems (collectively "systems") are built using hardware and software components which interact and interdepend on each other to provide a variety of services such as, for example, streaming services, voice services, and data services. Consequently, the addition of new services, the modification of existing services, hardware changes, and/or software changes can impact existing services and the systems. For example, developing requirements and test plans required analysts to research and review project artifacts to identify the impacted scenarios that could be extended to process flows, use cases, and user stories and test plans. The review effort could take several days to develop a requirement plan, and then a separate test plan is developed requiring additional time.

Current application lifecycle management (ALM) technology is unable to provide early and accurate methods and systems for identifying and evaluating services and systems impacted when additions or modifications are made to existing systems and services.

SUMMARY

Disclosed herein are methods and systems for predicting and generating impacted scenarios based on a defined set of attributes.

In implementations, an application lifecycle management system includes one or more databases and one or more processors connected to the one or more databases. The one or more processors are configured to receive a set of service provider system attributes for a project, generate attribute combinations from the set of service provider system attributes using a machine learning model trained on a reference data model, wherein the reference data model includes multiple test scenarios from the one or more databases, each test scenario associated with a test scenario attribute combination, generate predicted scenarios from the attribute combinations using the machine learning model, determine impacted service provider systems based on the predicted scenarios, determine issues based on each of the predicted scenarios, and generate a complexity score based on the determined impacted service provider systems and the determined issues to determine project viability.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
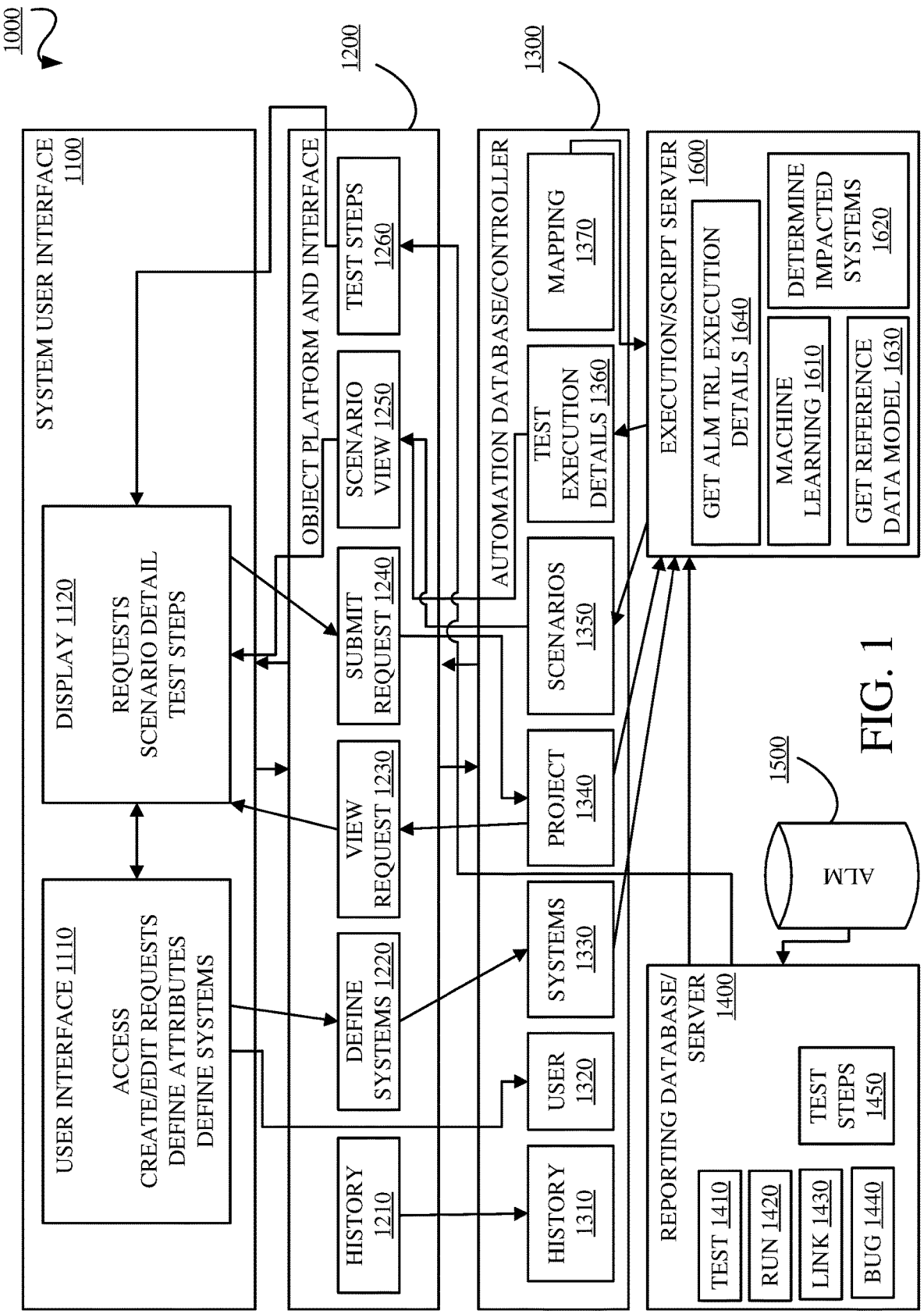
FIG. 1 is a diagram of an example a scenario analysis prediction and generator accelerator architecture in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. The computer can include, for example, a processor.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, data management, data visualization, telephony, web browsers, e-commerce transactions, media players, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

A service provider, for example, provides a variety of services to subscribers using a service provider system. The service provider system can be comprised of numerous systems which function together to provide the subscriber requested services. Projects to improve, modify, change, and make additions to the service provider system can impact existing systems and functionality. Consequently, great effort is expended in developing requirements and test plans by researching and reviewing project artifacts to identify impacted functionality and systems that could then be extended to draft process flows, use cases, user stories, and test plans. The review effort could take several days to develop a requirement plan, and then a separate test plan is developed requiring additional time.

Described herein are methods, apparatus, and systems for predicting and generating scenarios, providing systems impacted, and providing complexity scores for a project early in the development cycle which can decrease issues associated with missed scope and requirements. The system, application, and methods can use artificial intelligence and machine learning techniques to process a defined set of project attributes, in multiple combinations and permutations (collectively "attribute combinations"), to predict and generate a set of scenarios for each such attribute combination, generate impacted systems, and provide a complexity score based on the collective sets of scenarios and impacted systems. The examples herein are based on a service provider system which provides data, voice, Internet, and related services and are not intended to limit the scope of the specification and claims described herein. The attributes can be, for the example service provider system, customer type, ordering channel, activation channel, order intent, line of business, and similar features. For example, each such attribute can have multiple options. For example, customer type can be commercial or residential. For example, order intent can be new, renewal, suspend, and the like. For example, activation channel can be self-install, device management, interactive voice response, and the like.

FIG. 1 is a diagram of an example a scenario analysis prediction and generator accelerator system or architecture 1000 in accordance with embodiments of this disclosure. The system 1000 can be implemented in conjunction with or integrated with service provider systems. The system 1000 can include a system user interface 1100, an object platform and interface 1200, an automation database and/or controller 1300, a reporting database and/or server 1400, an application lifecycle management (ALM) database 1500, and an execution and/or script server 1600. The system user interface 1100, the object platform and interface 1200, the automation database and/or controller 1300, the reporting database and/or server 1400, the application lifecycle management (ALM) database 1500, and the execution and/or script server 1600 can be connected to and/or be in communication with (collectively "connected to") each other using one or more of pseudo-wire, wired, wireless, the Internet, an intranet, a low power wide area network (LP-WAN), a local area network (LAN), a wide area network (WAN), a public network, a private network, a cellular network, a Wi-Fi-based network, a telephone network, a landline network, public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof. In implementations, the system user interface 1100, the object platform and interface 1200, the automation database and/or controller 1300, the reporting database and/or server 1400, the application lifecycle management (ALM) database 1500, and the execution and/or script server 1600 can be implemented on or as a computing device(s) such as a server, cloud computing platform, distributed computing platform, and/or combinations thereof. The system user interface 1100, the object platform and interface 1200, the automation database and/or controller 1300, the reporting database and/or server 1400, the application lifecycle management (ALM) database 1500, and the execution and/or script server 1600 can be implemented on or as standalone implementations, integrated computing device implementations, and/or combinations thereof. The system 1000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein. Each of the components described in the architecture 1000 can include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

The system user interface 1100 can provide users access to and present results from the system 1000 as described herein. The system user interface 1100 can include a user interface 1110 connected to or integrated with a display 1120. The system user interface 1100 can be, for example, a computing device, a laptop, a desktop, a touchpad, and/or a device(s) which can accept input signals from a user for use by the system 1000 and display results from the system 1000 in response to the input signals. The user interface 1110 can be, for example, a virtual or physical keypad, audio devices, video devices, input sensors, or any combination thereof. The display 1120 can be, for example, an electroluminescent display (ELD), a liquid crystal display (LCD), a light emitting diode (LED) display, an organic light emitting diode (OLED) display, an active matrix organic light emitting diode (AMOLED), a quantum dot display, cathode ray tube (CRT) display, or other display devices.

The system user interface 1100 and/or the user interface 1110 can provide a user access to the system 1000 via a web browser application and a link and/or similar access functionality. A variety of techniques can be used to provide secure sign-on to the system. In addition, as described herein, the system user interface 1100 and/or the user interface 1110 can enable the user to create or edit requests for data from the system 1000. For example, in the request for data, the user can define a project, identify a set of project attributes, and input a set of initial systems that may be impacted.

The system user interface 1100 and/or the display 1120 can render results based on the requests. For example, the display 1120 can render access to spreadsheets and document files, which the user can open and review. In addition, the display 1120 can render access to previous requests, results (predicted scenarios, for example), and detailed information for each predicted scenario including, for example, test execution steps.

For example, the system user interface 1100 can provide a variety of pages which can include, but is not limited to, previous scenario requests page, a create request page, an edit request page, view scenarios overview page, a view scenarios systems page, a view scenarios activation channels page, a scenario test cases page, a scenario test steps page, a generate reports page, and a define systems page. The previous scenario requests page can be a list of existing scenario requests submitted by all users. The create request page can be a user input form with which a user inputs attributes associated with a project. The resulting attribute combinations are used to formulate a request to predict and generate a set of predicted scenarios, identify impacted systems, and determine a complexity score for a given project based on the attributes selected for the project. The edit request page can be a user input form to modify the input request. The view scenarios overview page can be a list of predicted scenarios, systems impacted and an overall complexity score for how difficult the effort would be based on the user input provided. The view scenarios systems page can be the systems identified based on the input request. The view scenarios activation channels page can be the activation channels selected. The scenario test cases page can be the test or predicted scenarios identified based on the user input. The scenario test steps page can be test case steps per test or predicted scenario. The define systems page can be a list of service provider systems.

The object platform and interface 1200 can process inputs and provide outputs using objects as between the system user interface 1100, the automation database and/or controller 1300, and the reporting database and/or server 1400. For example, the objects can include a history object 1210, a define systems object 1220, a view request object 1230, a submit request object 1240, a scenario view object 1250, and a test steps object 1260. For example, the object platform and interface 1200 can be implemented on or a server, cloud computing platform, and/or combinations thereof. The object platform and interface 1200 can be, for example, a Java software platform executing on a server for interfacing with the system user interface 1100, the automation database and/or controller 1300, and the reporting database and/or server 1400.

The automation database and/or controller 1300 can operationally control the flow of the system 1000 as executed by the execution and/or script server 1600. The automation database and/or controller 1300 can includes sub-databases, for example, which can correspond to objects in the object platform and interface 1200, such as a history database 1310, a systems database 1320, a project database 1330, a scenarios database 1340, and a test execution details database 1350. A user database 1360 is connected to the system user interface 1100 and a mapping database 1370 is connected to the reporting database and/or server 1400. For example, automation database and/or controller 1300 can be a relational database management system.

The history database 1310 can store all data related to user activity in the system 1000. For example, the data can be based on user actions related to creating a request, editing a request, viewing scenarios, defining systems, viewing test steps, and other user actions.

The systems database 1320 can store a list of systems in the service provider system with corresponding descriptions and system owners and/or responsible party.

The project database 1330 can store a list of existing scenario requests submitted by end users.

The scenarios database 1340 can include the test scenarios identified per request based on the user input.

The test execution details database 1350 can include the test scenario execution details for each test ID associated with a scenario. For example, the data can include the test, run, and link data.

The user database 1360 can store profile information for each user of the system 1000.

The mapping database 1370 can include and/or can be populated with test scenarios and corresponding attributes (that is, an attribute combination) for each test scenario to generate a reference data model. Each test scenario can include test IDs, test descriptions, and related information. The reference data model (test scenarios and attribute combinations) can be pulled from the ALM database 1500. In implementations, the reference data model for the mapping database 1370 can be defined based on test scenarios related to regression testing of the service provider system. In implementations, the reference data model for the mapping database 1370 can be defined based on test scenarios related to service provider system core functionality. For a service provider, a set of attributes can be customer type, ordering channel, order intent, and line of business. For example, the customer type can be selected from bulk, residential, small medium business, and the like. For example, the ordering channel can be selected from gateway ordering user interface, biller direct, gateway, and the like. For example, order intent can be selected from activation, cancel, change of service, new connect, disconnect, reconnect, reset, suspend, transfer, and the like. For example, the line of business can be data, phone, video, and combinations thereof. In implementations, an attribute can have one or selections or values.

The reporting database and/or server 1400 can obtain scenario detail information from the ALM database 1500. The reporting database and/or server 1400 can provide appropriate test case information or scenario detail information to the execution and/or script server 1600 and the test steps object 1260. The reporting database and/or server 1400 can include, for example, a test table 1410 which can store or track user activity performed in the system 1000 and includes the test scenarios, a run table 1420 which can store or provide execution status per test ID (that is, how many times a test scenario has been executed), a link table 1430 which can provide defect IDs associated with test and execution runs, a bug table 1440 which can store or provide defect root cause information for the test and execution runs, which leads to determinations of primary issues, and a steps table 1450 which stores or provides test steps per test ID. The test steps refer to the procedural steps that would be performed to carry out the execution of a test scenario (for example, navigate to the Account screen, enter Account Number into Account field, and click the Search button). Also included in the test steps are the expected outcomes of each step and the expected result of the test scenario (for example, the account information for the account number searched should return the account details including first name, last name, account creation date and account balance).

The ALM database 1500 can contain service provider system historical data including test cases, requirements data, results, test, run and link data (execution details) 1510 with respect to the test cases or test scenarios, and test case attributes which are used to predict and generate the predicted scenarios. In implementations, the results from the user requests can be feedback to the ALM 1500 to predict and generate scenarios for future user requests.

The execution and/or script server 1600 can execute scenario prediction and generation techniques using a machine learning platform or engine 1610, make system impact determinations 1620, and complexity determinations based on the user requests (e.g., the project attributes), get reference data model 1630 from the mapping database 1370, and execution details 1640. The reference data model 1630 is a mapping between the attributes and the scenarios.

The machine learning platform 1610 implements supervised learning techniques to establish a predictive analysis engine to generate a set of scenarios, impacted systems, and a complexity score for the overall scenarios set. In supervised learning, a computing device (such as the machine learning platform 1610) is trained with example inputs and desired outputs to learn a general rule that maps inputs to outputs. The predictive analysis engine uses Multiclass Multilabel Classification artificial intelligence libraries, for example, LinearSVC, OneVsRestClassifier, MultiLabelBinarizer. Support-vector machines (SVMs) are supervised learning models with associated learning algorithms that analyze data for classification and regression analysis. Multiclass classification means a classification task with more than two classes. In the system 1000, the ALM test data is classified and placed into the reference data model, which is then utilized in performing the predictive analysis. The inputs and reference models are applied to the learning algorithms.

Operationally, user input data is assembled into a concatenated string of attribute combinations and associated to a request. For example, assume the user input is: Customer Type: Residential; Ordering Channel: NextGen Gateway; Order Intent: New Connect; and LOB: Data Only, Video Only. Then the concatenated string of attribute combinations would be:
 residentialnextgengatewaynewconnectdataonly and
 residentialnextgengatewaynewconnectvideoonly.

As noted herein, the mapping database contains a relationship between the attribute combinations and the test IDs. For example, the mapping database can contain:
 F1="residentialnextgengatewaynewconnectdataonly"
 F2="residentialnextgengatewaychangeofservicedataonly"
 F3="residentialnextgengatewaynewconnectvideoonly"
 F4="smallmediumbusinessnextgengatewaynew
  connectdataonly"
 F5="smallmediumbusinessgatewayorderinguinew
  connectdataonly"
 T1=['1','5','7','13']
 T2=['2','5','18']
 T3=['5','25']
 T4=['2','25']
 T5=['4','33']
where Fx correspond to attribute combinations and Tx correspond to test IDs. The predictive analysis engine and associated predictive algorithms on the machine learning platform 1610 can use the user input (attribute combinations) and the mapping database information to generate the predicted scenario tests.

As noted herein, the predictive analysis engine and associated predictive algorithms are trained using known inputs and outputs. For example, the training data can be test scenarios for regression testing and core system impact. For example:

train_input=np.array(F1,F2,F3,F4,F5) \*\*\*\*\*\*\*\*\*\*\*\*put all of the training input into an array train_output=T1,T2,T3,T4,T5\*\*\*\*put all of the corresponding training output into an array.

As noted herein, the predictive analysis engine and associated predictive algorithms use user inputs. For example:

predict_input=np.array(predict_set) \*\*\*\*\*\*\*put all user input into an array A transformer can be used to convert a format such as list of sets into a multilabel format. For example:

Y=mlb.fit transform(train_output)
    mlb=MultiLabelBinarizer(classes=('1','2','4','5','7','13'))

The predictive analysis engine and associated predictive algorithms can then predict and generate the predicted test scenarios by:

classifier=Pipeline([('vectorizer,'CountVectorizer ( ),('clf',
    OneVsRestClassifier(LinearSVC( ))])
    classifier.fit(train_input, Y)
    predicted=classifier.predict(predict_input)
    predict_output=mlb.inverse_transform(predicted)

where "Pipeline" sequentially applies a list of transforms and a final estimator. Intermediate steps of the pipeline implement fit and transform methods. The final estimator implements fit. The "CountVectorizer" is used to transform a corpora of text to a vector of term/token counts. The "OneVsRestClassifier", also known as one-vs-all classifier, fits one classifier per class. For each classifier, the class is fitted against all the other classes. In addition to its computational efficiency (only n_classes classifiers are needed), since each class is represented by one and one classifier only, it is possible to gain knowledge about the class by inspecting its corresponding classifier. This is used for multiclass classification. The "LinearSVC" fits the data provided by returning a "best fit" hyperplane that divides, or categorizes, the data. After getting the hyperplane, some results are fed to the classifier to determine what the "predicted" class is.

In the example, the predict_output value will be 1,5,7,13, 25 as the generated attribute combinations predict attribute combinations F1 and F3 in the mapping database, which in turn are associated with test IDs T1 and T3.

In an operational overview, and as further described herein below, the execution and/or script server 1600 can obtain a project ID. The project ID can be used to associate a request with predicted scenarios as generated by the system 1000. The execution and/or script server 1600 can obtain the reference data model (1630) from the mapping database 1370 and obtain the project attribute information from the project database 1340 for a given project or project ID, The machine platform 1610 can be executed to predict and generate a set of predicted scenarios, which can be stored in the scenarios database 1340. The execution and/or script server 1600 can obtain the execution test case details from the reporting database and/or server 1400 for the predicted scenarios. The execution and/or script server 1600 can determine the systems impacted based on the predicted scenarios and the list of systems, where the systems are determined from the test steps in the predicted scenarios, and determine the primary issues associated with each of the predicted scenarios. The primary issues can be compiled per predicted test scenario and per attribute combination. The primary issues generally relate to issues which have a higher frequency of appearance as opposed to an issue which appears less often for a given number of executions of a predicted test scenario. For example, a test scenario may have been executed 50 times. Assume 40 test scenario executions passed and 10 test scenario executions failed. Further assume that of the 10 failed test scenario executions, 6 defects were logged for those 10 failures. The 6 defects which were logged (root causes of the defects) were the data configuration, environment down, test data, application, environment down, and environment down. In this instance, the primary issue for the failed executions is environment down. This is because 50% of the 6 defects were logged as environment down. The other identified issues, which may be listed as general issues, are data configuration, test data, and application.

Figure 2:
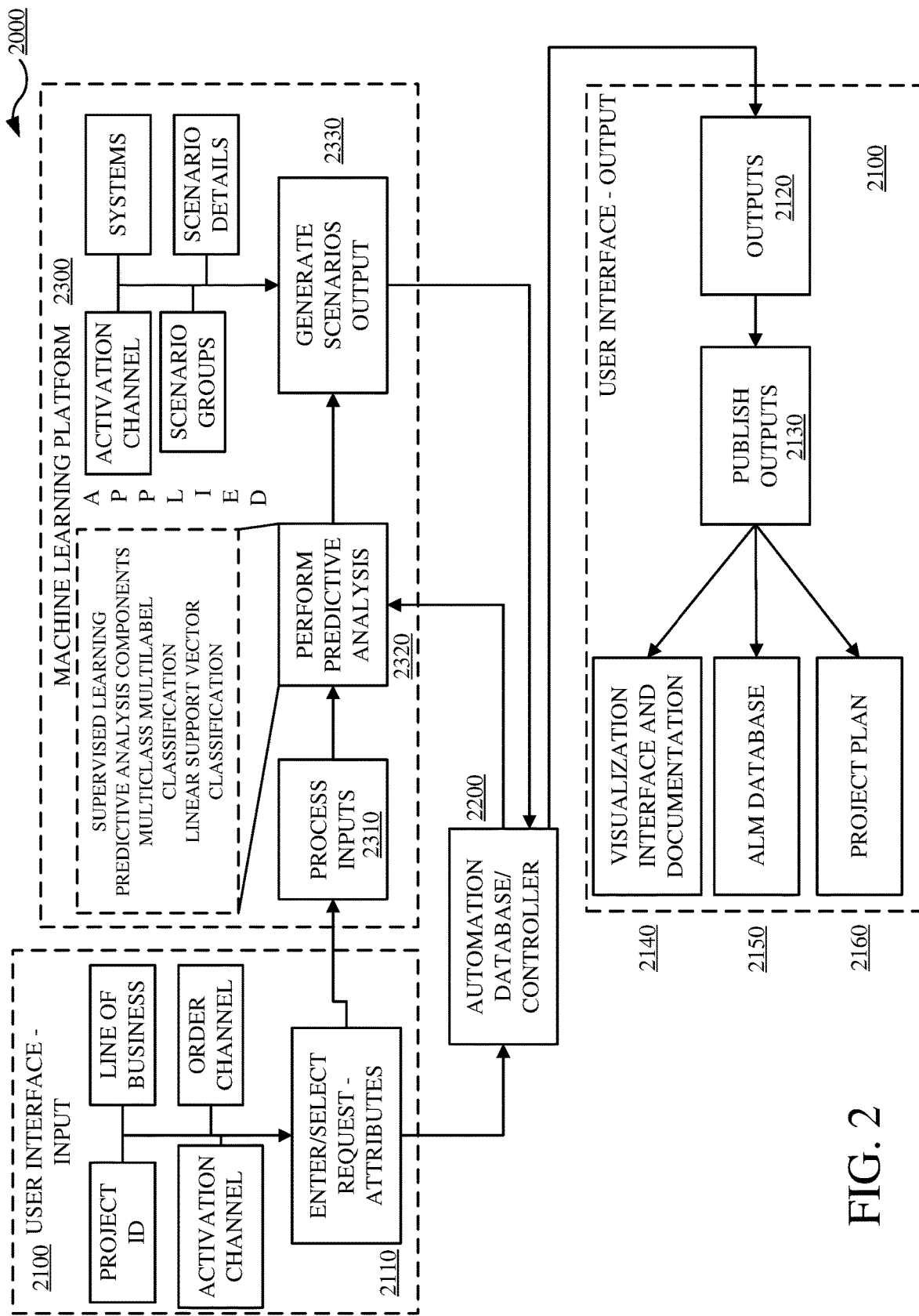
FIG. 2 is a diagram of an example a scenario analysis prediction and generator accelerator flow in accordance with embodiments of this disclosure.
Figure 3:
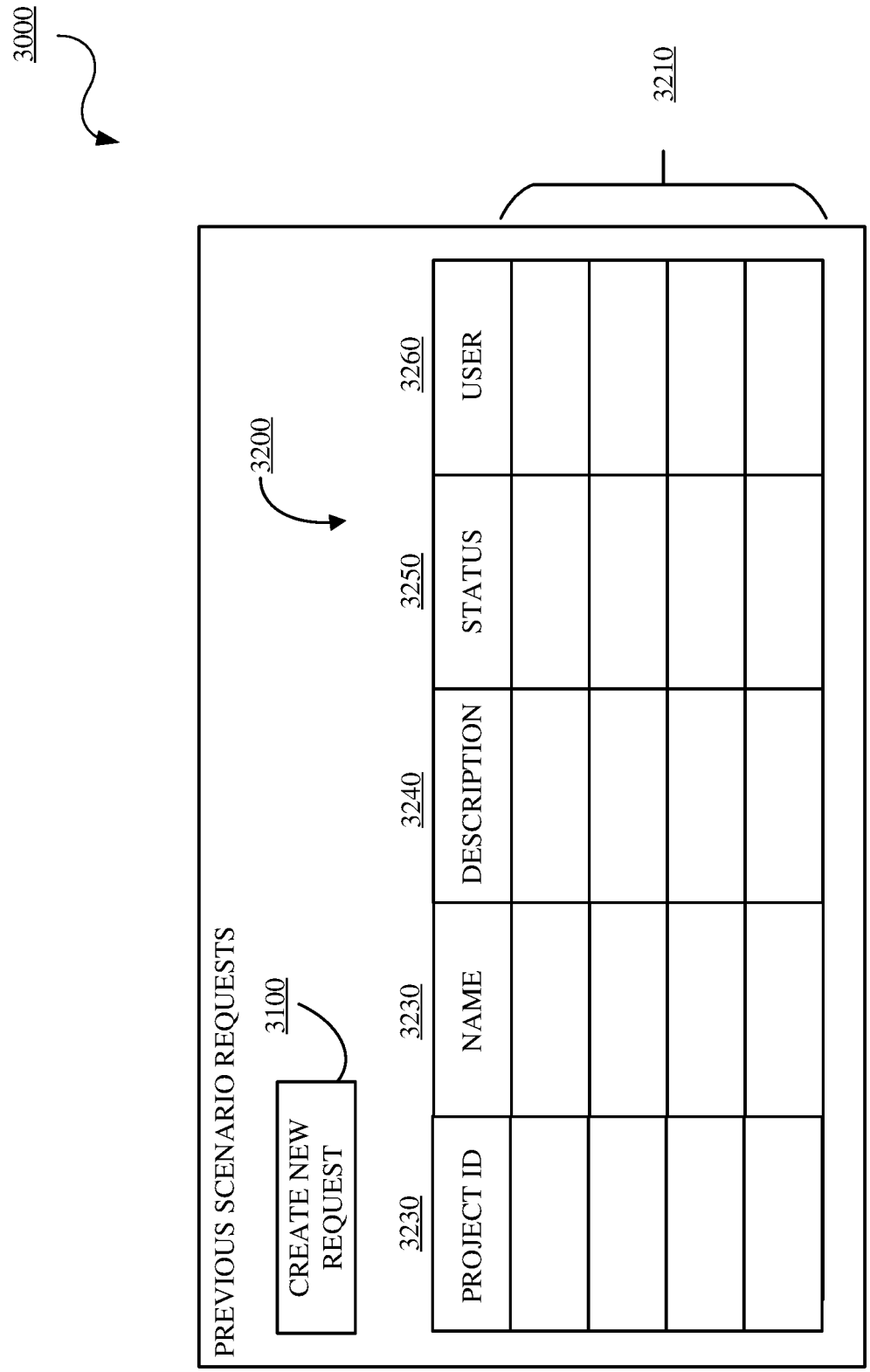
FIG. 3 is a diagram of an example page of a scenario analysis prediction and generator accelerator system in accordance with embodiments of this disclosure.
Figure 4:
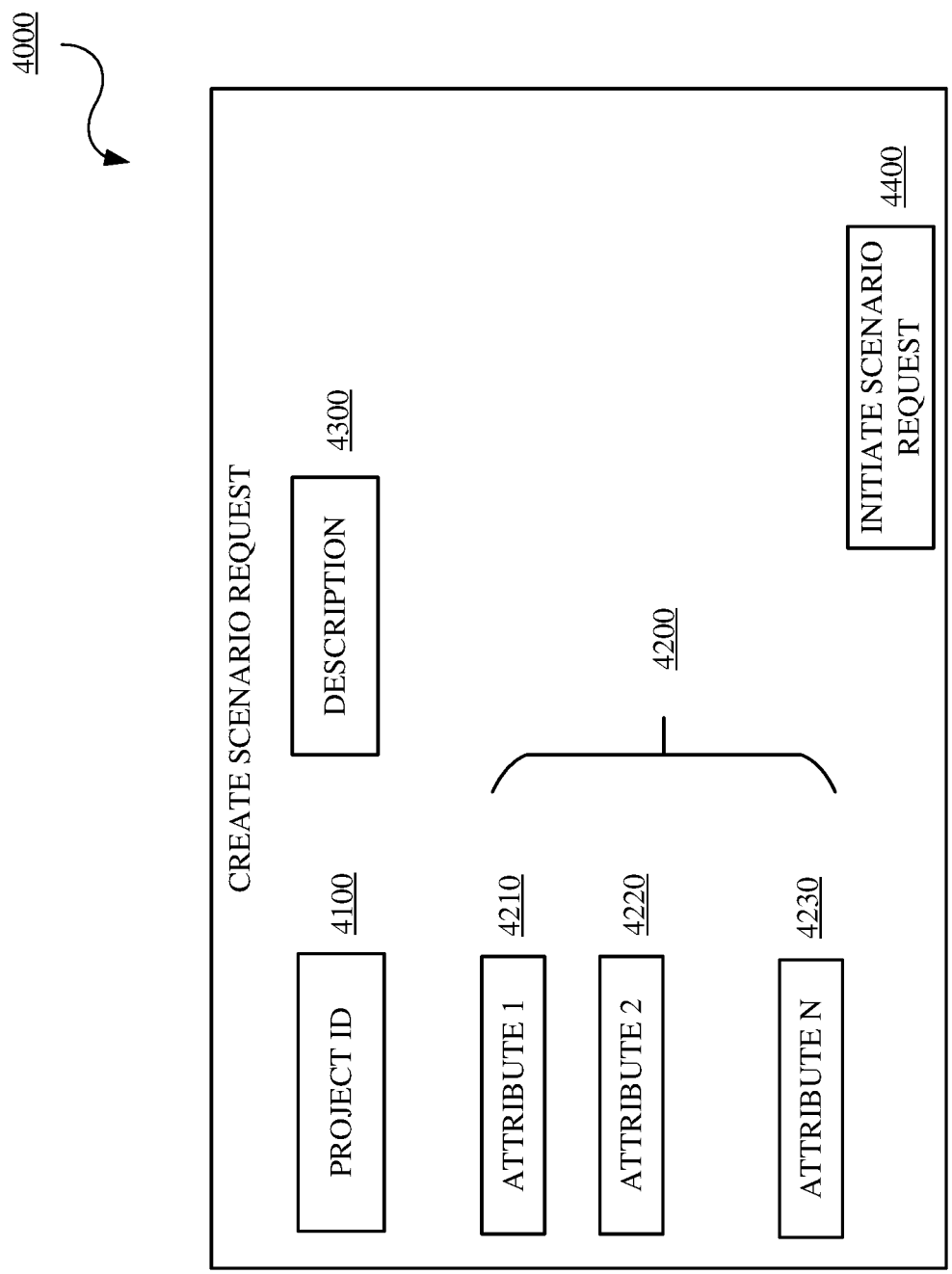
FIG. 4 is a diagram of an example page of a scenario analysis prediction and generator accelerator system in accordance with embodiments of this disclosure.
Figure 5:
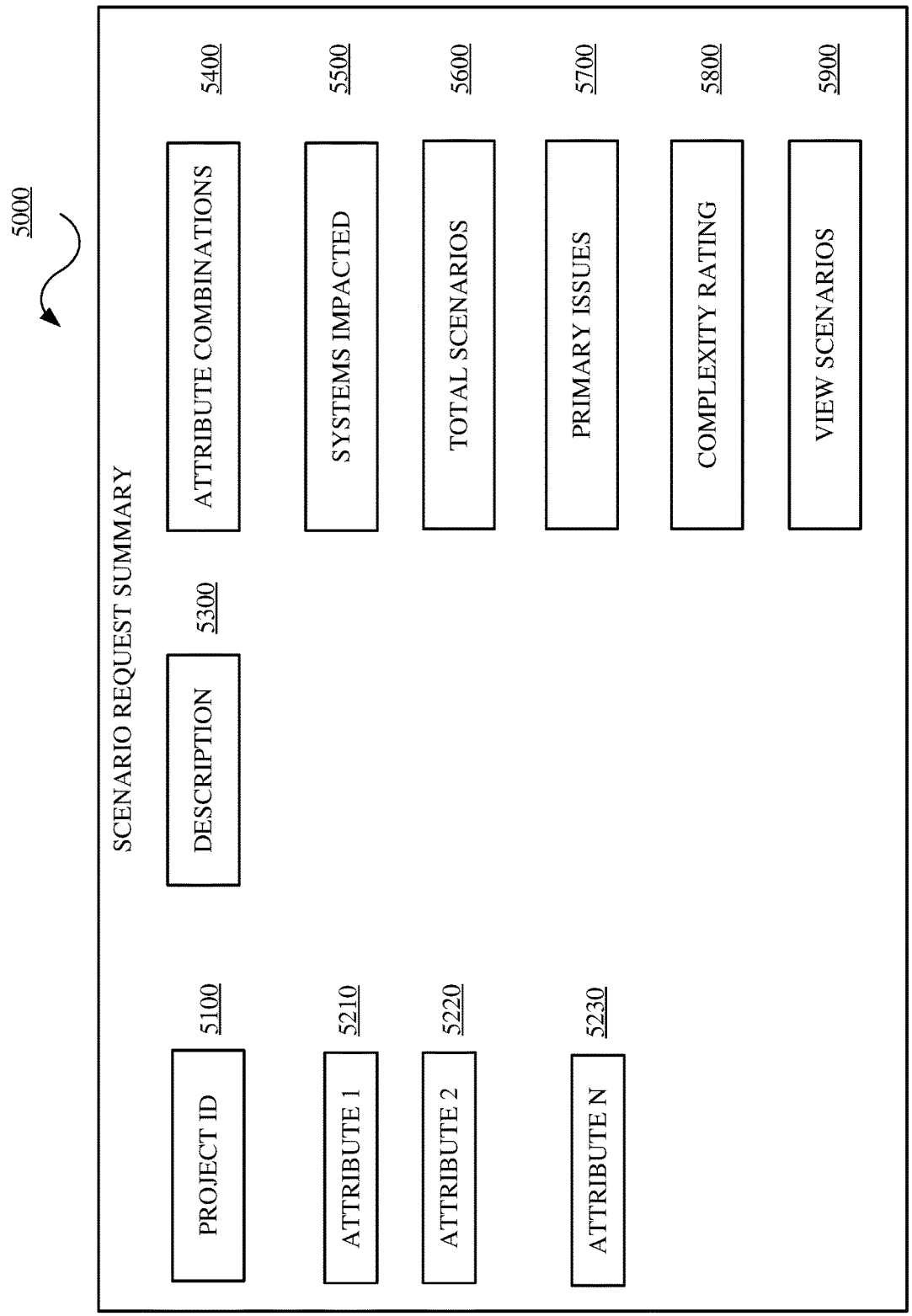
FIG. 5 is a diagram of an example page of a scenario analysis prediction and generator accelerator system in accordance with embodiments of this disclosure.
Figure 6:
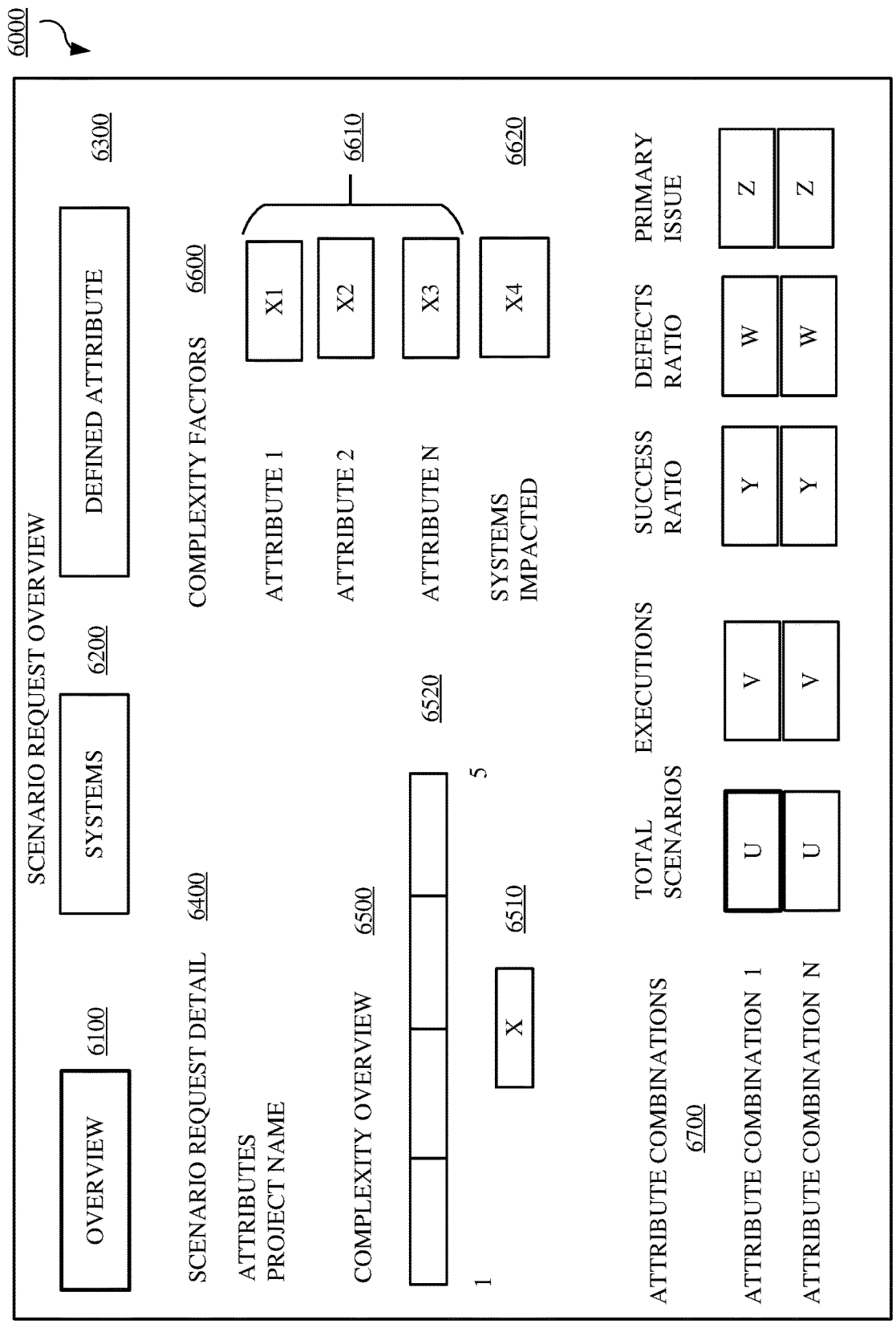
FIG. 6 is a diagram of an example page of a scenario analysis prediction and generator accelerator system in accordance with embodiments of this disclosure.
Figure 7:
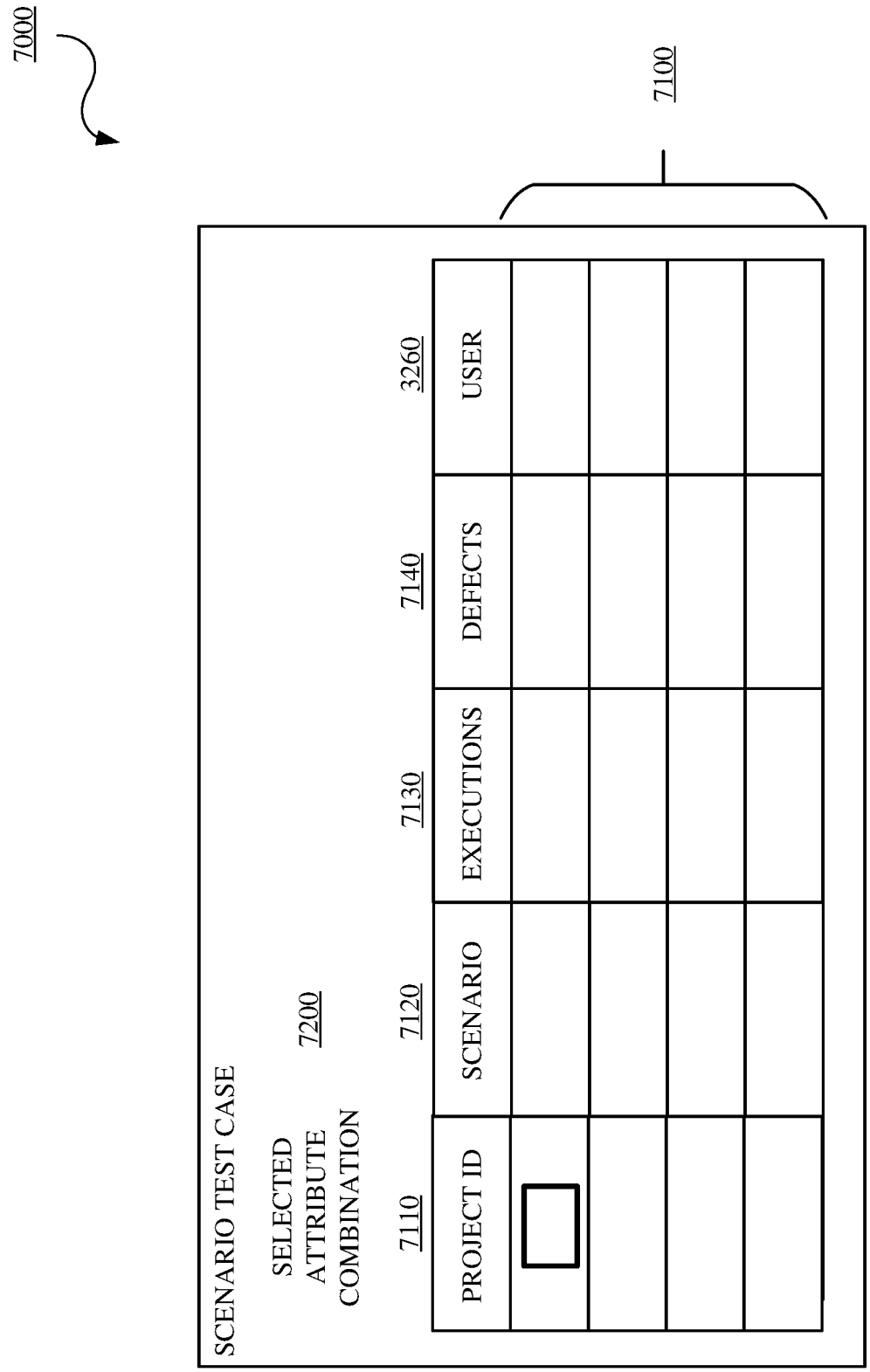
FIG. 7 is a diagram of an example page of a scenario analysis prediction and generator accelerator system in accordance with embodiments of this disclosure.
Figure 8:
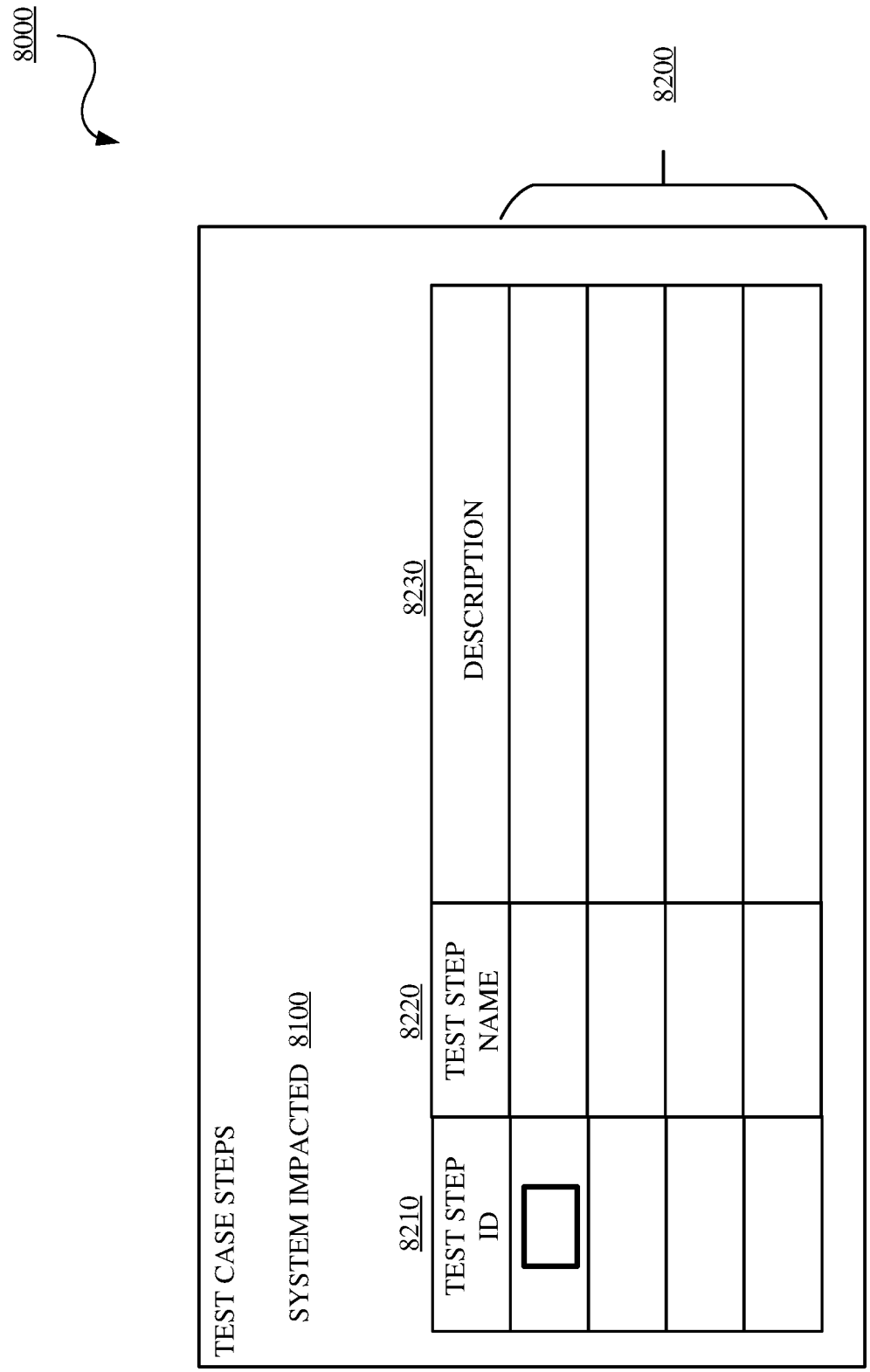
FIG. 8 is a diagram of an example page of a scenario analysis prediction and generator accelerator system in accordance with embodiments of this disclosure.
Figure 9:
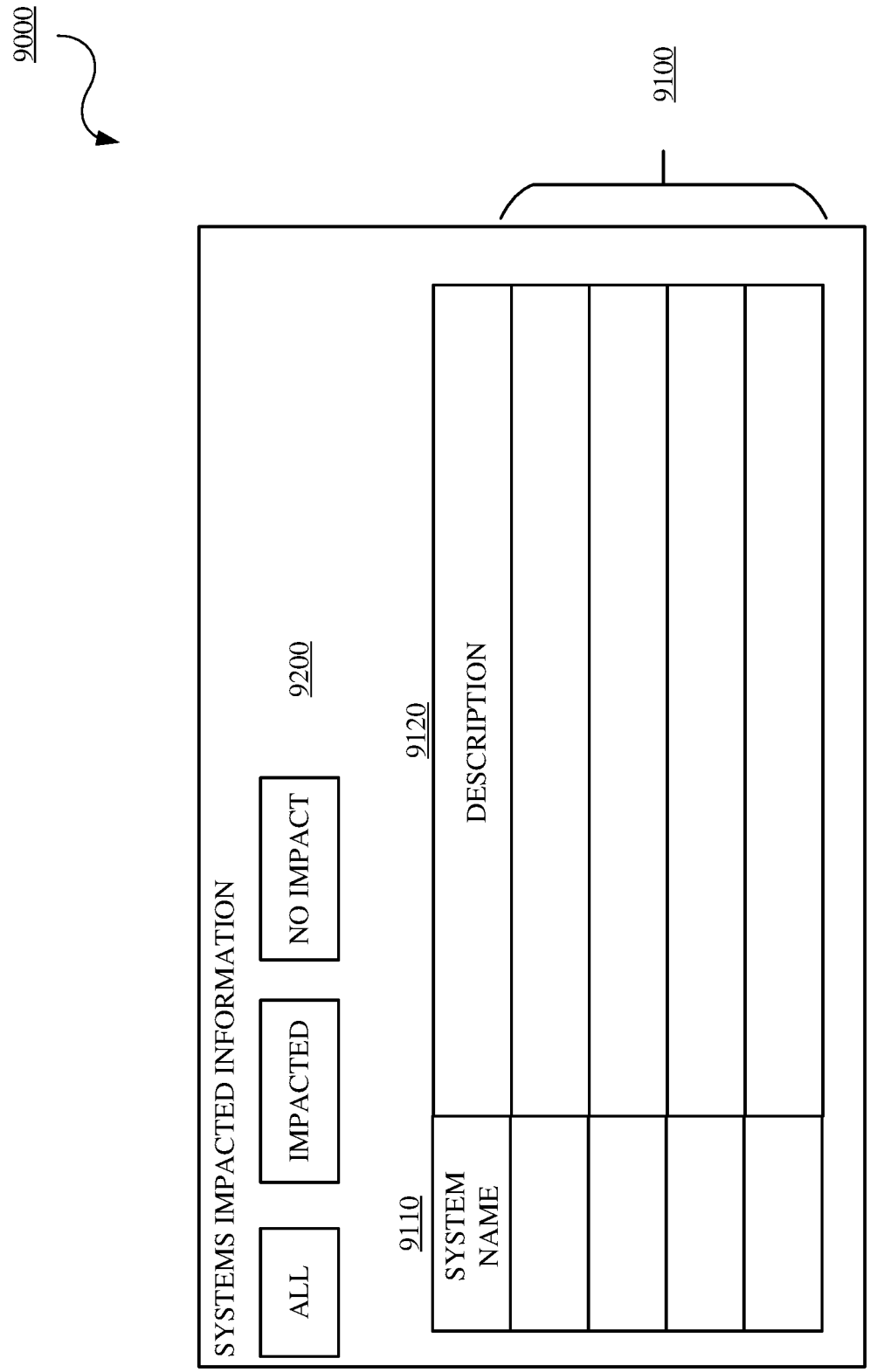
FIG. 9 is a diagram of an example page of a scenario analysis prediction and generator accelerator system in accordance with embodiments of this disclosure.
Figure 10:
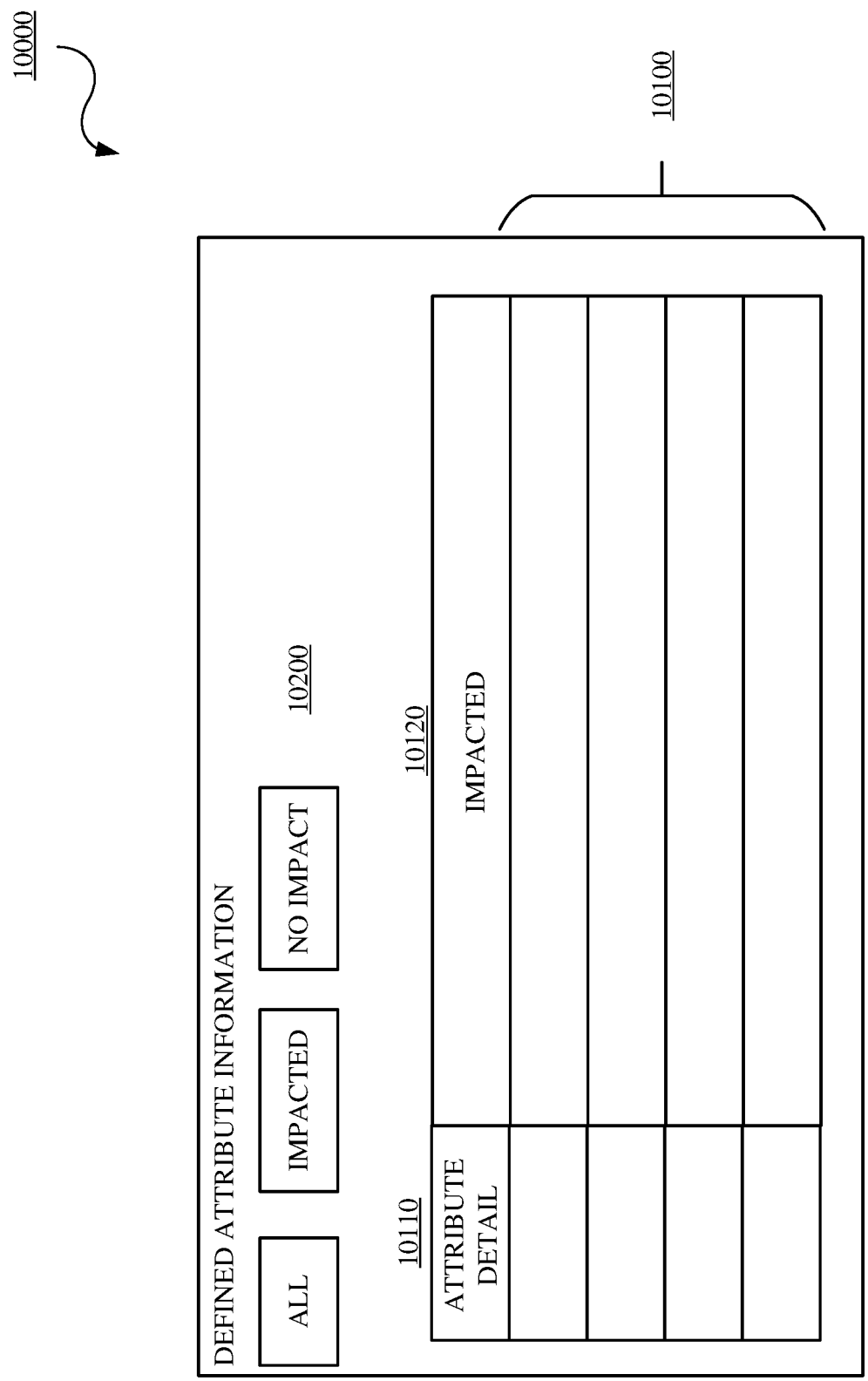
FIG. 10 is a diagram of an example page of a scenario analysis prediction and generator accelerator system in accordance with embodiments of this disclosure.

FIG. 2 is a diagram of an example a scenario analysis prediction and generator accelerator flow 2000 in accordance with embodiments of this disclosure. The scenario analysis prediction and generator accelerator flow 2000 can be implemented between a user interface 2100, an automation database and/or controller 2200, and a machine learning platform 2300. FIGS. 3-10 are example pages or screens which can be rendered as a user uses the scenario analysis prediction and generator accelerator. Various pages or screens can be shown dependent on the use case and are within the scope of the specification and claims described herein.

A user can use the user interface 2100 to access a scenario analysis prediction and generator accelerator system such as the scenario analysis prediction and generator accelerator system or architecture 1000. The user interface 2100 can include an input entry 2110 for entering and/or selecting attributes for a scenario request, review previous scenario requests, and/or combinations thereof. For example, screen 3000 is an example of an entry screen upon access to the scenario analysis prediction and generator accelerator system. For example, the screen 3000 can include a button 3100 to create a new scenario request and a screen area 3200 for rendering previous scenario requests 1, 2, . . . , M 3210. Each scenario request can include a project ID 3220, scenario request name 3230, description 3240, status 3250, user originator 3260, and other characteristic information.

In the event of a new scenario request, a screen 4000 can be rendered to the user. The screen 4000 can include a project ID entry input window/button 4100, an attribute entry input window/button 4200, a description entry input window/button 4300, an initiation or start button 4400, and other entry input window/buttons as desired. The attribute entry input window/button 4200 can include multiple attribute entry input windows/buttons 1, 2, . . . , N 4210, 4220, and 4230, respectively. As described herein, attribute combinations can be generated from the entered attributes for use in generation of the predicted scenarios.

Upon clicking of the initiation or start button 4400, for example, the machine learning platform 2300 can initiate processing of the user inputs (2310) such as the entered attributes. The machine learning platform 2300 can start performing predictive analysis (2320) based on the entered attributes and information obtained via the automation database and/or controller 2200 as described herein. The machine learning platform 2300 can apply the described machine learning techniques to the entered attributes in various attribute combinations to generate the predicted scenarios (2330) as described herein. The predicted scenarios and scenario information such as test step information, historical information, systems impacted information, and other similar information can be made available at the user interface (2120) via at least the automation database and/or controller 2200. The predicted scenarios and scenario information can be published (2130) by rendering on a display via a visualization interface (2140), sending to the ALM database for use in future scenario requests (2150), and incorporating into a project plan decision analysis and impact (2160).

For example, with respect to visualization, a screen 5000 can be rendered to the user upon selection of a scenario request. The screen 5000 can be a summary page which can include, for example, a project ID 5100, a list of the attributes 1, 2, . . . , N 5210, 5220, and 5230, a description of the scenario request 5300, list of attribute combinations 5400, systems impacted 5500, total scenarios 5600, primary issues 5700, a complexity rating 5800, and a view scenarios button 5900.

Upon selection of a scenario, a screen 6000 can be rendered to the user. The screen 6000 can provide a defined number of screen buttons to access scenario information including overview button 6100, systems button 6200, defined attribute 6300, and other buttons. For example, upon selection of the overview button 6100, the user provided details are rendered in scenario request detail 6400 including attributes 6410, project name 6420, and other information. In addition, a complexity overview area 6500 is rendered which shows an overall complexity rating 6510 based on a complexity rating scale 6520. A complexity factors area 6600 provides complexity ratings for attributes 1, 2, . . . , N 6610, systems impacted 6620, and other areas. This information can assist the user is assessing a project's potential level of effort. An attribute combinations area 6700 can render predicted scenarios for each attribute combination including a total scenarios button 6710, an executions number 6720, a success ratio percentage 6730, a defects ratio 6740, primary issue summary 6750, and other information. The overall complexity rating 6510 can be determined from a weighted combination of the attributes 1, 2, . . . , N 6610, systems impacted 6620, and other areas. Each of the attributes 1, 2, . . . , N 6610, systems impacted 6620 and other areas can have an individual complexity rating based on characteristics of the attribute, number of systems impacted, and the like, respectively.

Selection of the total scenarios button 6710 for a given attribute combination can render or provide a screen 7000 which can provide all test case scenarios 7100 for the selected attribute combination 7200 including project ID 7110, scenario, 7120, total executions 7130, success rates 7140, number of defects 7140, primary issues 7150, and other information. An individual test scenario can be selected to render a screen 8000 which can show systems impacted 8100 and test steps 8200 including test ID 8210, test step name 8220, description 8230, and other information.

Upon selection of the systems button 6200, a screen 9000 can be provided which lists systems impacted information 9100 based on selection of a filter button 9200. The systems impacted information 9100 can include system name, description, and other information.

Upon selection of the defined attribute button 6300, a screen 10000 can be provided which lists defined attribute information 10100 based on selection of a filter button 10200. The defined attribute information 10100 can list specific types of defined attribute 10110 and impact level 10120.

Figure 11:
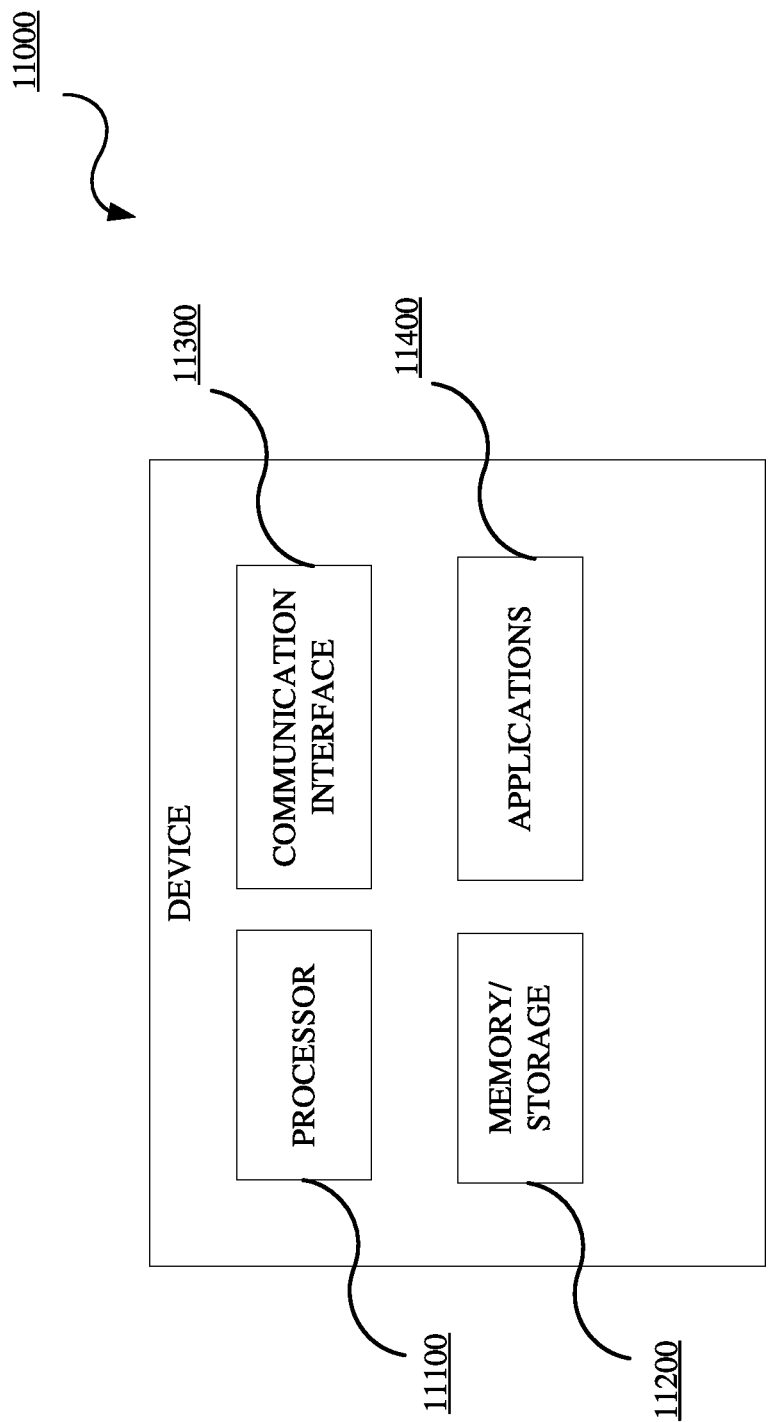
FIG. 11 is a block diagram of an example of a device in accordance with embodiments of this disclosure.

FIG. 11 is a block diagram of an example of a device 11000 in accordance with embodiments of this disclosure. The device 11000 may include, but is not limited to, a processor 11100, a memory/storage 11200, a communication interface 11300, and applications 11400. The device 11000 or multiples thereof may include or implement, for example, the system user interface 1100, the object platform and interface 1200, the automation database and/or controller 1300, the reporting database and/or server 1400, the application lifecycle management (ALM) database 1500, the execution and/or script server 1600, the user interface 2100, the automation database and/or controller 2200, and the machine learning platform 2300, for example. In an implementation, appropriate memory/storage 11200 may store the scenario analysis prediction and generator accelerator information described herein. In an implementation, appropriate memory/storage 11200 is encoded with instructions for scenario analysis prediction and generator acceleration. In an implementation, the applications 11400 can include software, object generation, script generation, and database rules used by the system user interface 1100, the object platform and interface 1200, the automation database and/or controller 1300, the reporting database and/or server 1400, the application lifecycle management (ALM) database 1500, the execution and/or script server 1600, the user interface 2100, the automation database and/or controller 2200, and the machine learning platform 2300, for example. The instructions can further include programmed instructions for performing one or more of analysis via convolutional neural networks, deep learning analysis, and/or machine learning. The techniques or methods described herein may be stored in appropriate memory/storage 11200 and executed by the appropriate processor 11100 in cooperation with the memory/storage 11200, the communications interface 11300, and applications 11400, as appropriate.

Figure 12:
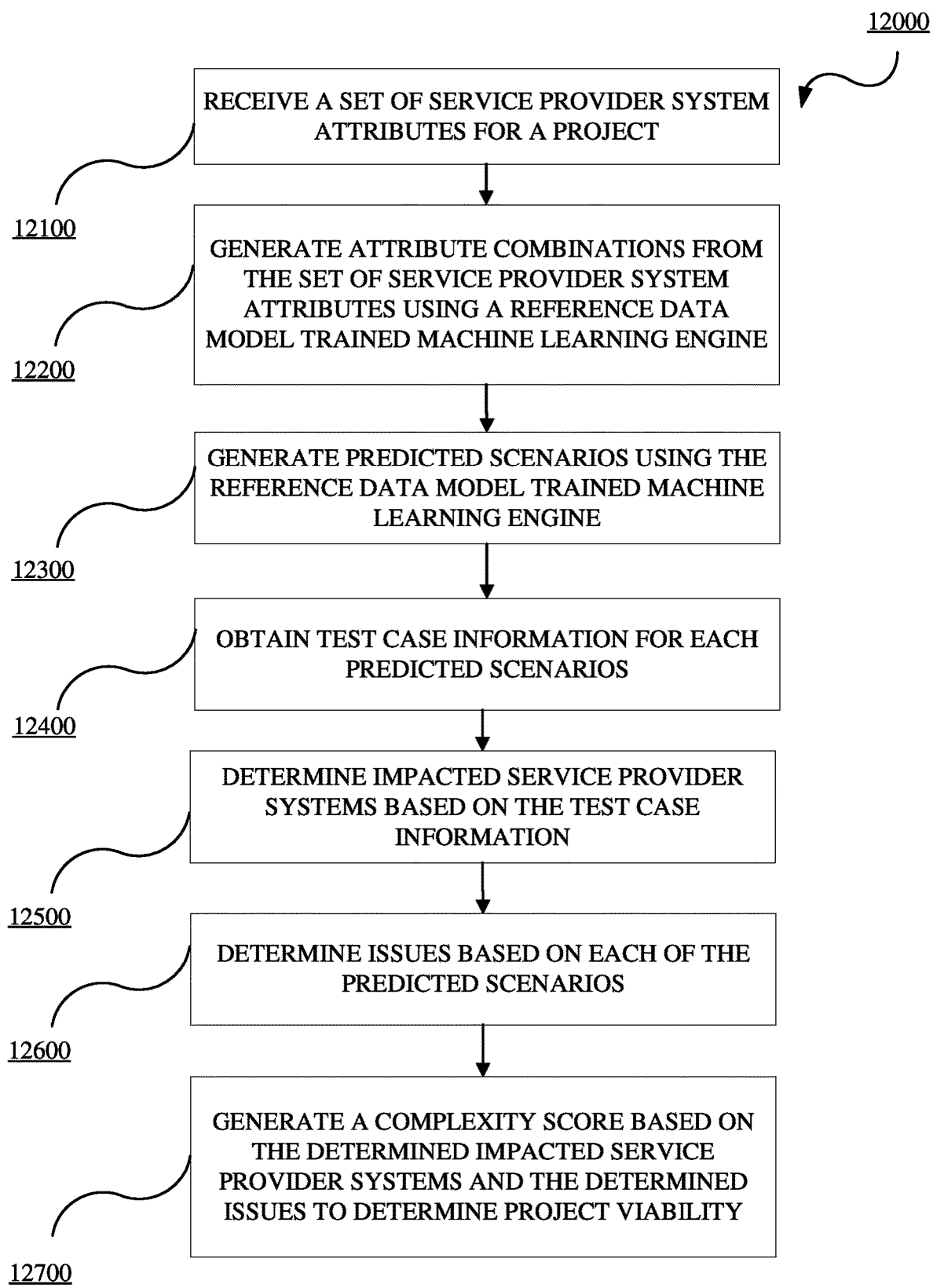
FIG. 12 is a flowchart of an example method for predicting scenarios in accordance with embodiments of this disclosure.

FIG. 12 is a flowchart of an example method 12000 for predicted scenario generation in accordance with embodiments of this disclosure. The method 12000 includes: receiving 12100 a set of service provider system attributes for a project; generating 12200 attribute combinations from the set of service provider system attributes using a reference data model trained machine learning engine; generating 12300 predicted scenarios using the reference data model trained machine learning engine; obtaining 12400 test case information for each predicted scenario; determining 12500 impacted service provider systems based on the test case information; determining 12600 issues based on each of the predicted scenarios; and generating 12700 a complexity score based on the determined impacted service provider systems and the determined issues to determine project viability. The method 12000 can be implemented, for example, in the system user interface 1100, the object platform and interface 1200, the automation database and/or controller 1300, the reporting database and/or server 1400, the application lifecycle management (ALM) database 1500, the execution and/or script server 1600, the user interface 2100, the automation database and/or controller 2200, and the machine learning platform 2300, the device 11000, the processor 11100, the memory/storage 11200, the communication interface 11300, and the applications 11400, as appropriate and applicable.

The method 12000 includes receiving 12100 a set of service provider system attributes for a project. A user of a scenario analysis prediction and generator accelerator system can input a set of attributes which define or is associated with specific or certain features and/or functionality in the service provider system.

The method 12000 includes generating 12200 attribute combinations from the set of service provider system attributes using a reference data model trained machine learning engine. A machine learning engine can generate a matrix of combinations based on the inputted attributes. The machine learning engine can be trained using a reference data model, which is based on historical test scenario data. The reference data model includes test scenarios from a ALM database, each test scenario associated with an attribute combination.

The method 12000 includes generating 12300 predicted scenarios using the reference data model trained machine learning engine as described herein.

The method 12000 includes obtaining 12400 test case information for each predicted scenario. The system can obtain from a database test case details for each predicted scenario.

The method 12000 includes determining 12500 impacted service provider systems based on the test case information. The service provider system includes multiple systems. A list of these systems which are impacted by the project can be generated based on the predicted scenarios.

The method 12000 includes determining 12600 issues based on each of the predicted scenarios. Based on historical data, issues associated with each predicted scenario can be determined. This can be provided per predicted scenario, per attribute combination, or combinations thereof.

The method 12000 includes generating 12700 a complexity score based on the determined impacted service provider systems and the determined issues to determine project viability. The complexity score can provide a real-time or near real-time assessment based on the systems impacted and issues for a given project. A complexity score can be given for each attribute.

Described herein is an application lifecycle management system which includes one or more databases and one or more processors connected to the one or more databases. The one or more processors configured to receive a set of service provider system attributes for a project, generate attribute combinations from the set of service provider system attributes using a machine learning model trained on a reference data model, wherein the reference data model includes multiple test scenarios from the one or more databases, each test scenario associated with a test scenario attribute combination, generate predicted scenarios from the attribute combinations using the machine learning model, determine impacted service provider systems based on the predicted scenarios, determine issues based on each of the predicted scenarios, and generate a complexity score based on the determined impacted service provider systems and the determined issues to determine project viability.

In implementations, the test scenarios used in the reference data model provide regression testing for core functionality in a service provider system. In implementations, the test scenarios are historical test data. In implementations, the one or more processors are further configured to obtain test case information for each predicted scenario, wherein the issues are determined from the obtained test case information. In implementations, the impacted service provider systems are determined from a list of systems determined from the obtained test case information. In implementations, the issues are provided per predicted scenario. In implementations, the issues are provided per attribute combination. In implementations, the complexity score is provided per attribute.

Described herein is an application lifecycle management method which includes maintaining a database with test scenarios previously executed with respect to system improvements to a service provider system, training a machine learning model on a reference data model, wherein the reference data model includes multiple test scenarios from the one or more databases, each test scenario associated with a test scenario attribute combination, receiving service provider system attributes for a system improvement, generating attribute combinations from the service provider system attributes using the machine learning model, generating predicted scenarios from the attribute combinations using the machine learning model, determining impacted service provider systems based on the predicted scenarios, determining issues based on each of the predicted scenarios, and generating a complexity rating based on the determined impacted service provider systems and the determined issues to determine project viability.

In implementations, the test scenarios used in the reference data model provide regression testing for core functionality in the service provider system. In implementations, the test scenarios are historical test data. In implementations, the method further includes obtaining test case information for each predicted scenario, wherein the issues are determined from the obtained test case information. In implementations, the impacted service provider systems are determined from a list of systems determined from the obtained test case information. In implementations, the issues are provided per predicted scenario. In implementations, issues are provided per attribute combination. In implementations, the complexity rating is provided per attribute.

Described herein is a non-transitory computer storage medium storing computer-useable instructions that, when used by one or more processors, cause the one or more processors to receive a set of service provider system attributes for a project, generate attribute combinations from the set of service provider system attributes using a machine learning model trained on a reference data model, wherein the reference data model includes multiple test scenarios from the one or more databases, each test scenario associated with a test scenario attribute combination, generate predicted scenarios from the attribute combinations using the machine learning model, determine impacted service provider systems based on the predicted scenarios, determine issues based on each of the predicted scenarios, and generate a complexity score based on the determined impacted service provider systems and the determined issues to determine project viability In implementations, the test scenarios used in the reference data model provide regression testing for core functionality in the service provider system. In implementations, the test scenarios are historical test data. In implementations, the impacted service provider systems are determined from a list of systems determined from test case information associated with each predicted scenario.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. An application lifecycle management system, comprising:
   one or more databases; and
   one or more processors connected to the one or more databases and to a memory storing instructions, wherein execution of the instructions by the one or more processors cause the one or more processors to:
      implement supervised learning techniques to establish a predictive analysis engine, wherein the predictive analysis engine uses Multiclass Multilabel Classification artificial intelligence libraries and a reference data model to generate attribute combinations, generate predicted scenarios, determine issues and generate a complexity score;
      receive a set of service provider system attributes for a project, wherein the set of service provider system attributes defines or is associated with specific features or functionality in a service provider system;
      generate the attribute combinations from the set of service provider system attributes using the predictive analysis engine, wherein the predictive analysis engine is trained on the reference data model;
      generate the predicted scenarios from the attribute combinations using the predictive analysis engine;
      determine the issues based on the predicted scenarios; and
      generate the complexity score based on at least the determined issues to determine project viability including with respect to hardware and software systems used in the service provider system, wherein the reference data model includes test scenarios from the one or more databases, each test scenario associated with a test scenario attribute combination and wherein the test scenarios used in the reference data model provide regression testing for core functionality in the service provider system.

2. The application lifecycle management system of claim 1, wherein the test scenarios are historical test data.

3. The application lifecycle management system of claim 1, wherein the one or more processors are further configured to:
obtain test case information for each predicted scenario, wherein the issues are determined from the obtained test case information.

4. The application lifecycle management system of claim 3, the one or more processors further configured to:
determine impacted service provider systems based on the predicted scenarios, wherein the impacted service provider systems are determined from a list of systems determined from the obtained test case information.

5. The application lifecycle management system of claim 1, wherein the issues are provided per predicted scenario.

6. The application lifecycle management system of claim 1, wherein the issues are provided per attribute combination.

7. The application lifecycle management system of claim 1, wherein the complexity score is provided per attribute.

8. An application lifecycle management method, comprising:
maintaining one or more databases with test scenarios previously executed with respect to system improvements to a service provider system;
training a predictive analysis engine on a reference data model;
implementing supervised learning techniques to establish the predictive analysis engine, wherein the predictive analysis engine uses Multiclass Multilabel Classification artificial intelligence libraries and the reference data model to generate attribute combinations, generate predicted scenarios, determine issues and generate a complexity score;
receiving service provider system attributes for a system improvement, wherein the service provider system attributes define or are associated with specific features or functionality in the service provider system;
generating the attribute combinations from the service provider system attributes using the predictive analysis engine;
generating the predicted scenarios from the attribute combinations using the predictive analysis engine;
determining the issues based on the predicted scenarios; and
generating the complexity rating based on at least the determined issues to determine project viability including with respect to hardware and software systems used in the service provider system,
wherein the reference data model includes test scenarios from the one or more databases, each test scenario associated with a test scenario attribute combination and wherein the test scenarios used in the reference data model provide regression testing for core functionality in the service provider system.

9. The application lifecycle management method of claim 8, wherein the test scenarios are historical test data.

10. The application lifecycle management method of claim 8, further comprising:
obtaining test case information for each predicted scenario, wherein the issues are determined from the obtained test case information.

11. The application lifecycle management method of claim 10, further comprising:
determining impacted service provider systems based on the predicted scenarios, wherein the impacted service provider systems are determined from a list of systems determined from the obtained test case information.

12. The application lifecycle management method of claim 8, wherein the issues are provided per predicted scenario.

13. The application lifecycle management method of claim 8, wherein the issues are provided per attribute combination.

14. The application lifecycle management method of claim 8, wherein the complexity rating is provided per attribute.

15. A non-transitory computer storage medium storing computer-useable instructions that, when used by one or more processors, cause the one or more processors to:
implement supervised learning techniques to establish a predictive analysis engine, wherein the predictive analysis engine uses Multiclass Multilabel Classification artificial intelligence libraries and a reference data model to generate attribute combinations, generate predicted scenarios, determine issues and generate a complexity score;
receive a set of service provider system attributes for a project, wherein the set of service provider system attributes defines or is associated with specific features or functionality in a service provider system;
generate the attribute combinations from the set of service provider system attributes using the predictive analysis engine, wherein the predictive analysis engine is trained on the reference data model;
generate the predicted scenarios from the attribute combinations using the predictive analysis engine;
determine the issues based on the predicted scenarios; and
generate the complexity score based on least the determined issues to determine project viability including with respect to hardware and software systems used in the service provider system,
wherein the reference data model includes test scenarios from one or more databases, each test scenario associated with a test scenario attribute combination and wherein the test scenarios used in the reference data model provide regression testing for core functionality in the service provider system.

16. The medium of claim 15, wherein the test scenarios are historical test data.

17. The medium of claim 15, further cause the one or more processors to:
determine impacted service provider systems based on the predicted scenarios, wherein the impacted service provider systems are determined from a list of systems determined from test case information associated with each predicted scenario.

* * * * *